(12) United States Patent
Phillips et al.

(10) Patent No.: US 8,226,013 B2
(45) Date of Patent: Jul. 24, 2012

(54) METHOD AND APPARATUS FOR USE IN PROVIDING AN IDENTIFICATION TOKEN

(75) Inventors: Simon Phillips, York (GB); Stephen Marshall-Rees, Andover (GB)

(73) Assignee: MasterCard International, Inc., Purchase, NY (US)

( * ) Notice: Subject to any disclaimer, the term of this patent is extended or adjusted under 35 U.S.C. 154(b) by 246 days.

(21) Appl. No.: 11/924,841

(22) Filed: Oct. 26, 2007

(65) Prior Publication Data
US 2009/0108060 A1    Apr. 30, 2009

(51) Int. Cl.
*G06K 7/00*    (2006.01)
*G06K 19/02*    (2006.01)

(52) U.S. Cl. .................... 235/486; 235/488
(58) Field of Classification Search .......... 235/486, 235/482, 483, 485, 488
See application file for complete search history.

(56) References Cited

U.S. PATENT DOCUMENTS

| | | | |
|---|---|---|---|
| 3,044,606 A * | 7/1962 | Frosh ........................ 206/0.83 |
| 4,439,941 A * | 4/1984 | Halperin .................. 40/124.191 |
| 5,276,311 A | 1/1994 | Hennige |
| 5,585,787 A | 12/1996 | Wallerstein |
| 5,955,961 A | 9/1999 | Wallerstein |
| 6,179,210 B1 * | 1/2001 | Haas et al. ..................... 235/488 |
| 6,315,195 B1 | 11/2001 | Ramachandran |
| 6,353,811 B1 | 3/2002 | Weissman |
| 6,561,432 B1 | 5/2003 | Vedder et al. |
| 6,631,849 B2 | 10/2003 | Blossom |
| 6,715,679 B1 | 4/2004 | Infosino |
| 6,764,005 B2 | 7/2004 | Cooper |
| 6,766,952 B2 | 7/2004 | Luu |
| 6,863,220 B2 | 3/2005 | Selker |
| 6,978,940 B2 | 12/2005 | Luu |
| 7,012,504 B2 | 3/2006 | Tuttle |

(Continued)

FOREIGN PATENT DOCUMENTS

WO    98/33193 A1    7/1998

(Continued)

OTHER PUBLICATIONS

International Standard, "Identification cards—Physical Characteristics", ISO/IEC 7810, Third Edition, Nov. 1, 2003, 18pgs.

(Continued)

*Primary Examiner* — Thien M Le
(74) *Attorney, Agent, or Firm* — Buckley, Maschoff & Talwalkar LLC

(57) ABSTRACT

According to some embodiments, a method comprises: providing a card sized to fit within a card personalization machine, the card including a surface defining at least a portion of a recess; inserting at least a portion of a sub-card into the recess; providing adhesive between the surface and the sub-card to releasably retain the at least a portion of the sub-card within the recess; and personalizing the sub-card, using the card personalization machine, while the at least a portion of the sub-card is within the recess. According to some embodiments, apparatus comprises: a card defining a recess; a sub-card, at least a portion of the sub-card being inserted into the recess; adhesive to releasably retain the at least a portion of the sub-card within the recess; and a card personalization machine to personalize the sub-card while the at least a portion of the sub-card is within the recess.

17 Claims, 18 Drawing Sheets

U.S. PATENT DOCUMENTS

| | | | |
|---|---|---|---|
| 7,114,659 B2 * | 10/2006 | Harari et al. | 235/492 |
| 7,143,419 B2 | 11/2006 | Fischer et al. | |
| 7,204,412 B2 | 4/2007 | Foss, Jr. | |
| 7,264,172 B2 | 9/2007 | Amiot et al. | |
| 7,559,478 B2 * | 7/2009 | Amiot et al. | 235/486 |
| 7,673,805 B2 * | 3/2010 | Onishi et al. | 235/486 |
| 7,861,385 B1 * | 1/2011 | Meyer | 27/1 |
| 2003/0132301 A1 | 7/2003 | Selker | |
| 2004/0124248 A1 | 7/2004 | Selker | |
| 2004/0195340 A1 * | 10/2004 | Lubking | 235/493 |
| 2004/0223305 A1 | 11/2004 | Amiot et al. | |
| 2005/0258245 A1 | 11/2005 | Bates et al. | |
| 2006/0137464 A1 | 6/2006 | Baudendistel | |
| 2007/0278317 A1 * | 12/2007 | Onishi et al. | 235/495 |
| 2008/0011859 A1 | 1/2008 | Phillips | |
| 2008/0035740 A1 | 2/2008 | Tanner | |
| 2008/0054078 A1 | 3/2008 | Tanner | |
| 2008/0061148 A1 | 3/2008 | Tanner | |
| 2008/0061149 A1 | 3/2008 | Tanner | |
| 2008/0061150 A1 | 3/2008 | Phillips | |
| 2008/0061151 A1 | 3/2008 | Phillips | |
| 2008/0121707 A1 | 5/2008 | Phillips et al. | |
| 2008/0165006 A1 | 7/2008 | Phillips | |
| 2009/0040695 A1 * | 2/2009 | Fidalgo et al. | 361/679.31 |
| 2009/0065575 A1 | 3/2009 | Phillips et al. | |
| 2009/0065587 A1 | 3/2009 | Phillips | |

FOREIGN PATENT DOCUMENTS

| | | | |
|---|---|---|---|
| WO | 99/38173 A1 | | 7/1999 |
| WO | 00/79546 A1 | | 12/2000 |
| WO | WO2005/088530 | * | 9/2005 |

OTHER PUBLICATIONS

"The Design of a Smart Card Interface Device: Chapter 5—Smart Card Protocols and ISO 7816-4", Retrieved Feb. 22, 2007. Retrieved from URL:http://www.cs.uct.ac.za/Research/DNA/SOCS/rchap5.html, 10pgs.

Jay MacDonald, "Calling Dick Tracy: Credit card watches debut", Mar. 24, 2009, Credit Cards.com, 2pgs.

Leslie Berlin, "Cellphones as Credits? Americans Must Wait", Jan. 24, 2009, The New York Times, [Retrieved Jan. 26, 2009]. Retrieved from URL:http://www.nytimes.com/2009/01/25/business/25proto.html?_r=1&em, 3pgs.

"Speedpass and Timex offer payments-by-wristwatch", Dec. 10, 2002, [Retrieved Mar. 31, 2009]. Retrieved from URL:http://www.finextra.com/fullstory.asp?id=7530, 2pgs.

"JCB pilots contactless payments", Apr. 1, 2004, [Retrieved Mar. 31, 2009]. Retrieved from URL:http://www.finextra.com/fullstory.asp?id=11549, 2pgs.

JCB delivers contactless Offica service over Casio wrist watch, Jun. 14, 2004, [Retrieved Mar. 31, 2009]. Retrieved from URL:http://www.finextra.com/fullstory.asp?id=11994, 2pgs.

"MasterCard launches OneSmart Paypass", Nov. 2, 2004, [Retrieved Mar. 31, 2009]. Retrieved from URL:http://www.finextra.com/fullstory.asp?id=12788, 2pgs.

"Visa launches contactless payments systems in US", Feb. 25, 2005, [Retrieved Mar. 31, 2009]. Retrieved from URL:http//www.finextra.com/fullstory.asp?id=13291, 2pgs.

"Contact sports fans go contactless with MasterCard PayPass", Feb. 22, 2005, [Retrieved Mar. 31, 2009]. Retrieved from URL:http://www.finextra.com/fullstory.asp?id=13291, 2pgs.

Ian Rowley (in Tokyo), "$5,000? Put It on My Cell ", Jun. 6, 2005, Asian Business, Business Week, [Retrieved. Mar. 31, 2009]. Retrieved from URL:http://www.businessweek.com/print/magazine/content/05_23/b3936060.htm?chan=gl, 2pgs.

"Citibank to roll out MasterCard PayPass contactless keyring", Aug. 25, 2005, [Retrieved Mar. 31, 2009]. Retrieved from URL:http://www.finextra.com/fullstory.asp?id=14154, 2pgs.

Michael Fitzgerald, "Use your Cell Phone Instead of Your Credit Card", Monday, Sep. 19, 2005, PC World Communications, Inc., 2ps.

"Chinatrust releases PayPass-enabled wrist watch", Jun. 7, 2006, [Retrieved Mar. 31, 2009]. Retrieved from URL:http://www.finextra.com/fullstory.asp?id=15406, 2pgs.

"Turkey's Garanti Bank to issue PayPass wrist watch", May 8, 2007, [Retrieved Mar. 31, 2009]. Retrieved from URL:http://www.finextra.com/fullstory.asp?id=16902, 2pgs.

"Turkey gets wristwatch with built-in credit card", May 11, 2007, [Retrieved Mar. 30, 2009]. Retrieved from URL:http://www.wristdreams.com/archives/2007/05/turkey_gets_wri.html, 4pgs.

"Wristwatch Equipped With a Built-In Credit Card", Thursday, May 17, 2007, [Retrieved Mar. 30, 2009]. Retrieved from URL:http://www.crookedbrains.net/2007/05/wristwatch-equipped-with-built-in.html, 4pgs.

"Wristwatch With Built-In Credit Card", Saturday, May 26, 2007, [Retrieved Mar. 30, 2009]. Retrieved from URL:http://www.funniestgadgets.com/2007/05/26/wristwatch-with-built-in-credit-card/, 3pgs.

Karen Bruno, "Artist peddling designs for your credit card", Aug. 8, 2007, [Retrieved Mar. 31, 2009]. Retrieved from URL:http://www.creditcards.com/credit-card-news/credit-card-designs-and-covers-1273.php, 3pgs.

"Credit Card Rings (1964)", Thursday, Sep. 13, 2007, Paleo-Future, [Retrieved Mar. 30, 2009]. Retrieved from URL:http://www.paleofuture.com/blog/2007/9/14/credit-card-rings-1964.html, 5pgs.

"Altair unveils pre-paid contactless PayPass wrist watch", Jun. 27, 2008, [Retrieved Mar. 31, 2009]. Retrieved from URL:http://www.finextra.com/fullstory.asp?id=18654, 3pgs.

* cited by examiner

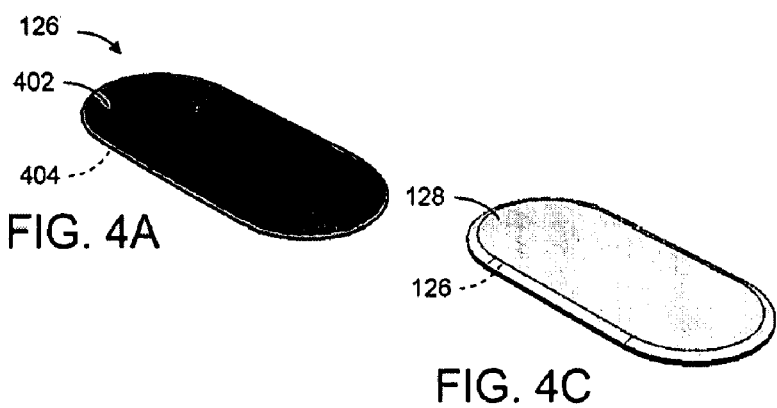
FIG. 4A
FIG. 4C
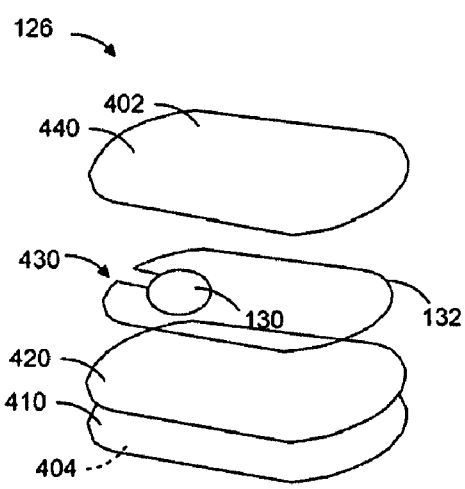
FIG. 4B

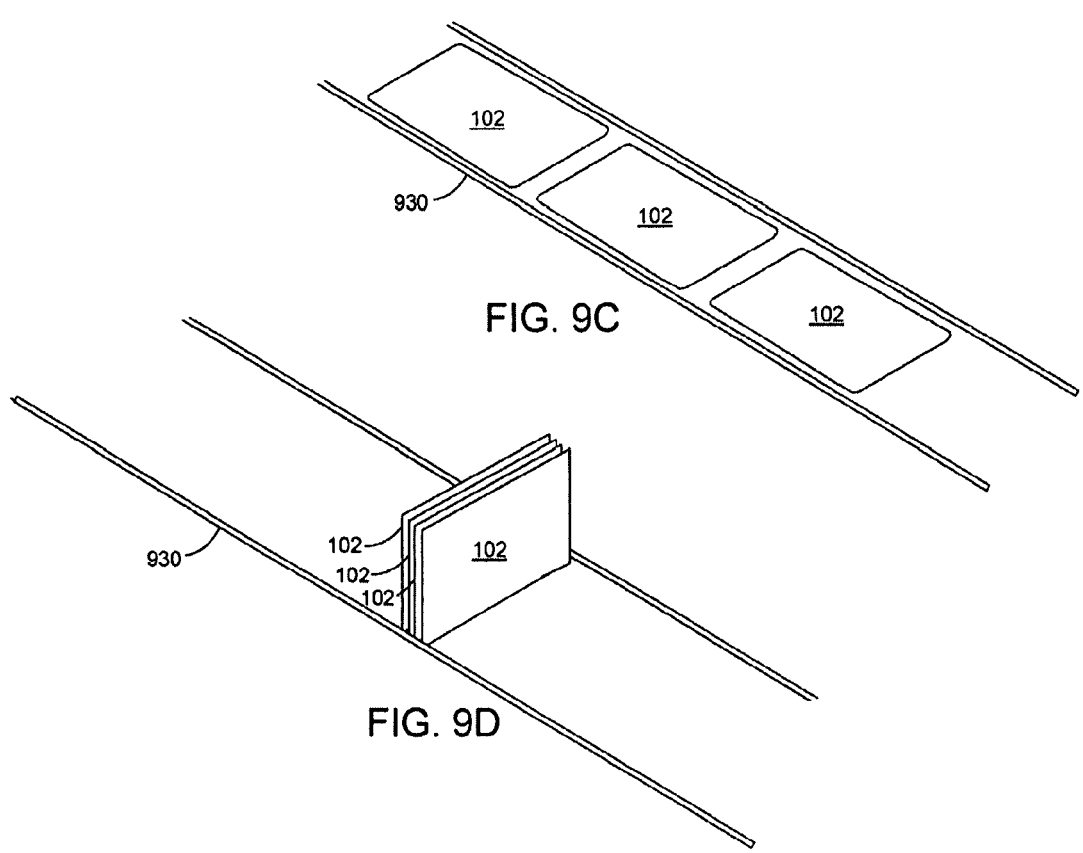

METHOD AND APPARATUS FOR USE IN PROVIDING AN IDENTIFICATION TOKEN

BACKGROUND

Proximity payment devices are in widespread use. A well known standard for proximity payment devices has been promulgated by MasterCard International Incorporated, the assignee hereof, and is referred to as "PayPass". A proximity payment device often includes a wireless communication interface to transmit a payment account number and/or other information to a point of sale (POS) terminal. The wireless interface often includes a radio frequency identification integrated circuit (RFID IC) and an antenna to receive a power signal from and/or communicate with the POS terminal.

Automated equipment has been developed to personalize the blanks used in producing proximity payment cards. Personalizing a blank often includes storing a payment account number and/or other information in an RFID IC portion of the blank.

Proximity payment devices are often card-shaped and resemble a standard credit card in size. For this reason, a significant proportion of the above mentioned automated equipment is designed to handle blanks the size of standard credit cards, i.e., the well-known ID-1 standard in terms of dimensions.

There have been proposals to issue proximity payment devices that are smaller than the standard sized card. One issue associated with such proposals is that a significant proportion of automatic equipment cannot readily handle proximity payment device that are smaller than a standard sized payment card.

BRIEF DESCRIPTION OF THE DRAWINGS

FIGS. 4A-4D show a method for fabricating a sub-card, in accordance with some embodiments;

FIG. 9C is a schematic perspective view of a plurality of cards disposed within a personalization machine, in accordance with some embodiments;

FIG. 9D is a schematic perspective view of a plurality of cards within a personalization machine, in accordance with some embodiments;

DETAILED DESCRIPTION

Figure 1A:
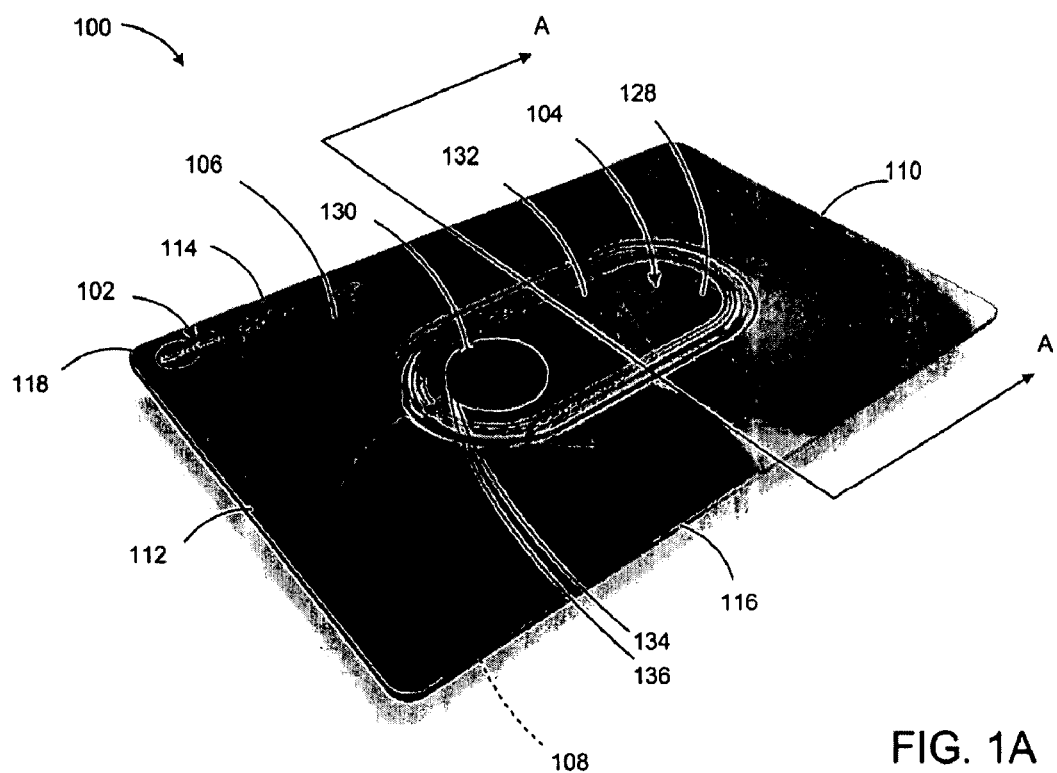
FIG. 1A is a perspective view of a blank, in accordance with some embodiments.
Figure 1B:
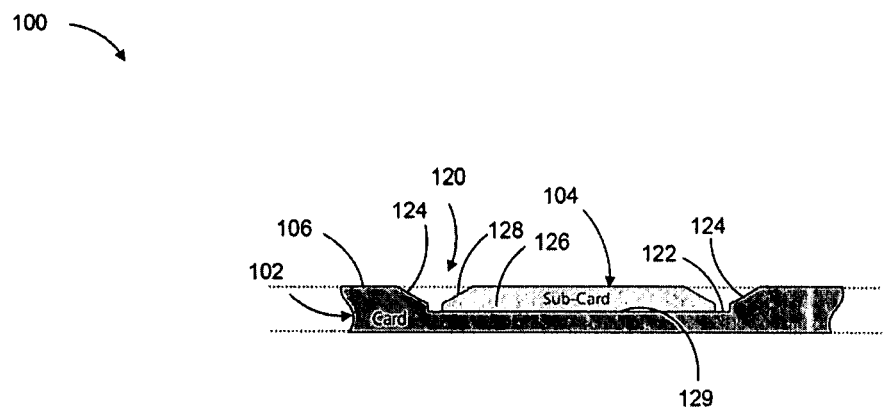
FIG. 1B is a schematic cross sectional view of the blank of FIG. 1A, in the direction A-A of FIG. 1A, in accordance with some embodiments.

FIG. 1A is a perspective view of a blank for use in producing a proximity payment device, in accordance with some embodiments. FIG. 1B is a schematic cross sectional view of the blank in the direction A-A of FIG. 1A, in accordance with some embodiments.

Referring to FIG. 1A, in accordance with some embodiments, a blank 100 for use in producing a proximity payment device may include a card 102 and a sub-card 104. The card 102 may be formed of plastic or other suitable material and may resemble a conventional payment card in shape and size. In some embodiments, the card 102 may have dimensions as defined for the standard card referred to as "ID1" in ISO/IEC standard 7810, promulgated by the International Standardization Organization and other bodies.

The card 102 may include a first major outer surface 106, a second major outer surface 108, a right edge 110, a left edge 112, a top edge 114 and a bottom edge 116. The right edge 110 may be parallel to the left edge 112. The top edge 114 may be parallel to the bottom edge 116. The top edge 114 and the bottom edge 116 may be perpendicular to right edge 110 and the left edge 112. Rounded corners, such as for example, rounded corner 118, may join adjacent edges.

Referring to FIG. 1B, the card 102 may define a recess 120 that extends through the first major outer surface 106. The card 102 may further include a surface 122 that defines a bottom of the recess 120 and may further include one or more surfaces, e.g., surface 124, that define one or more sides of the recess 120. One or more portions of the recess 120 may be tapered.

The sub-card 104 may have a length and a width smaller than the length and the width, respectively, of the card 102. In the illustrated embodiment, the sub-card 104 has a footprint that is the same size as or slightly smaller than the surface that defines the bottom of the recess 120.

In some embodiments, the sub-card 104 has a thickness that is less than 1.6 millimeters (mm). The sub-card 104 may include a base 126 and a top 128. The base 126 may be in contact with and/or releasably attached to the surface 122 that defines the bottom of the recess 120. The top 128 may be tapered so as to define a dome-like shape. Clearances may be provided between the sub-card 104 and the one or more surfaces, e.g., surface 124, that define the one or more sides of the recess 120.

One or more portions of the sub-card 104 may be disposed within the recess 120. In the illustrated embodiment, all portions of the sub-card 104 are disposed within the recess 120.

As further described herein, adhesive 129 may be disposed between the sub-card 104 and the card 102 to releasably retain the at least a portion of the sub-card 104 within the recess 120. The adhesive 129 may comprise an adhesive backing on the sub-card 104 that permits the sub-card 104 to be peeled away from the card 102. The sub-card 104 may thereafter be manually or otherwise attached to a device.

The sub-card 104 may further include an RFID IC 130 and an antenna 132. Unless stated otherwise, the term RFID is not limited to a specific type of RFID. In some embodiments, an RFID may be a simple memory device capable only of responding to a pre-defined set of commands. In some other embodiments, an RFID may comprise a microcontroller capable of executing a program. Some embodiments may include further features. Some other embodiments may comprise other configurations altogether.

The RFID IC 130 may include electrically conductive contact pads 134, 136 via which RFID IC 130 may be electrically connected to the antenna 132. The antenna 132 may comprise several loops arranged along the periphery of the sub-card 104. Alternatively, the antenna 132 may be of a different type and/or configuration.

If provided with a payment account number and/or other information, the sub-card 104 is capable of operating as a proximity payment device. Accordingly, the sub-card 104 is sometimes referred to herein as the proximity payment device.

If the sub-card 104 includes the RFID IC 130 and the antenna 132, one or more portions of the sub-card 104 may define a support structure that supports the RFID IC 130 and the antenna 132. As used herein, the phrase "a support structure that supports the RFID IC 130 and the antenna 132" means that the RFID IC 130 and the antenna 132 are at least (i) partially and/or entirely disposed on, disposed in, contained in, mounted on, mounted in, installed on, installed in and/or embedded in the support structure and/or (ii) partially and/or entirely disposed on, disposed in, contained in, mounted on, mounted in, installed on, installed in and/or embedded in one or more components that are supported by the support structure. In some embodiments, the support structure of the sub-card 104 may be formed of plastic and/or other suitable material(s).

One or more logos and/or brands, including for example the brand/logo of a national and/or international payment card association such as MasterCard International Incorporated, may be provided on one or more surfaces of the card 102 and/or sub-card 104. The brand/logo of the issuer may also be provided, as well as, for example, a specific card product brand. Embossed or non-embossed numbers and/or letters may be provided on the card 102 and/or sub-card 104 to indicate one or more account numbers and/or a name of an account holder. Other features that may be provided on the card 102 and/or sub-card 104 are an adhesive paper strip to receive the signature of the cardholder, and a security code or the like printed on the adhesive strip.

Figure 2:
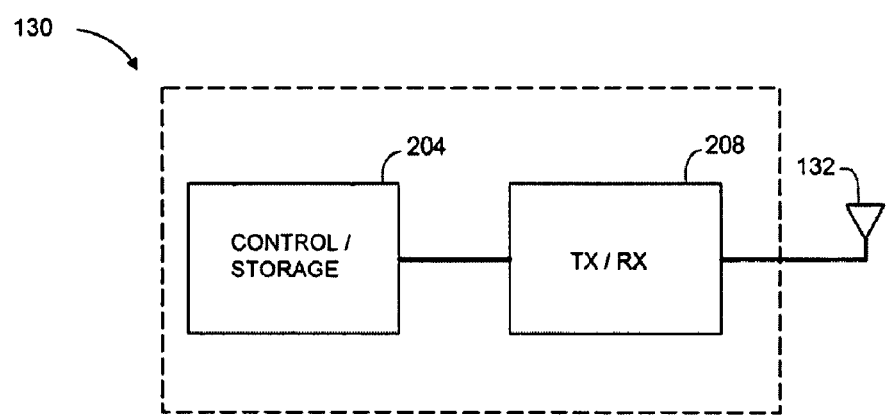
FIG. 2 is a schematic block diagram of an RFID IC in accordance with some embodiments.

FIG. 2 is a schematic block diagram of the RFID IC 130 in accordance with some embodiments. Referring to FIG. 2, in accordance with some embodiments, the RFID IC 130 may include control/storage circuitry 204 and transmit/receive circuitry 208.

The control/storage circuitry 204 may be operative to store a payment account number and/or other information to be transmitted to a POS terminal. As stated above, if provided with a payment account number and/or other information, the sub-card 104 is capable of operating as a proximity payment device. In some embodiments, the control/storage circuitry 204 may be a simple memory device capable only of responding to a pre-defined set of commands. In some other embodiments, the control/storage circuitry 204 may comprise a secure microcontroller capable of executing a pre-defined program.

The transmit/receive circuitry 208 may be connected to the antenna 132, e.g., via electrically conductive pads 134, 136 (FIG. 1A). The transmit/receive circuitry 208 and the antenna 132 together define a wireless communication interface that facilitates wireless communication with a POS terminal. In that regard, wireless communication signals (e.g., RF signals) are received by the antenna 132 and supplied to the transmit/receive circuitry 208, which in response, provides signals that are supplied to the control/storage circuitry 204. The control/storage circuitry 204 also provides signals that are supplied to the transmit/receive circuitry 208, which in response, provides signals that are supplied to the antenna 132 and transmitted thereby.

In some embodiments, the RFID IC 130 comprises an IC that uses contactless technology, such as, for example, that specified in the international standard ISO/IEC14443.

Figure 3A:
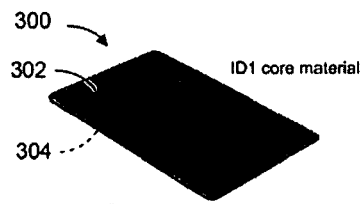
FIGS. 3A-3D show a method for fabricating a card, in accordance with some embodiments.

FIGS. 3A-3D show a method for fabricating the card 102, in accordance with some embodiments. Referring to FIG. 3A, in accordance with some embodiments, a core 300 may be provided. The core 300 may be card shaped and may have first and second major outer surfaces 302, 304. Artwork and/or other information may be applied or otherwise provided on one or both of the surfaces 302, 304.

Figure 3B:
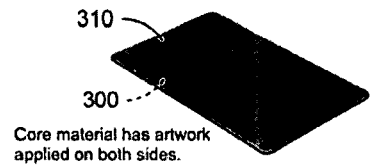

Referring to FIG. 3B, a top layer 310 may be disposed on one of the major outer surfaces 302, 304 of the core 300. The top layer 310 may have a shape that is the same as and/or similar to that of the core 300 and may be disposed in register with the core 300 such that outer edges of the top layer 310 are aligned with outer edges of the core 300. Heat and/or pressure may be applied to the core 300 and/or the top layer 310. The heat and/or pressure may cause the core 300 and the top layer 310 to become bonded to one another, thereby forming a laminate that includes the core 300 and top layer 310.

Figure 3C:
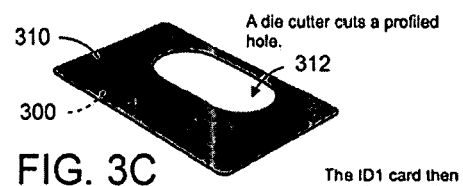

Referring to FIG. 3C, an opening 312 may be formed in the core 300 and the top layer 310 to define one or more portions of the recess 120 (FIG. 1B). In some embodiments, the opening 312 is formed by cutting, punching and/or milling the core 300 and the top layer 310.

Figure 3D:
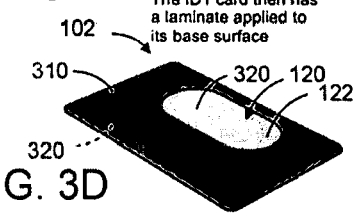

Referring to FIG. 3D, the core 300 and top layer 310 may be disposed on a base layer 320. The base layer 320 may have a shape that is the same as and/or similar to that of the core 300 and/or top layer 310. The base layer 320 may be disposed in register with the core 300 and top layer 310. The base layer 320 may define the surface 122 that defines the bottom of the recess 120.

Heat and/or pressure may be applied to the top layer 310 and/or the base layer 320. The heat and/or pressure may cause the base layer 320 to become bonded to the core 300 and/or top layer 310, thereby forming a laminate that includes the core 100, the top layer 310 and the base layer 320. In some embodiments, the core 300, the top layer 310 and the base layer 320 are each formed of plastic or other suitable material.

Other configurations may also be employed for the card 102.

Figure 4D:
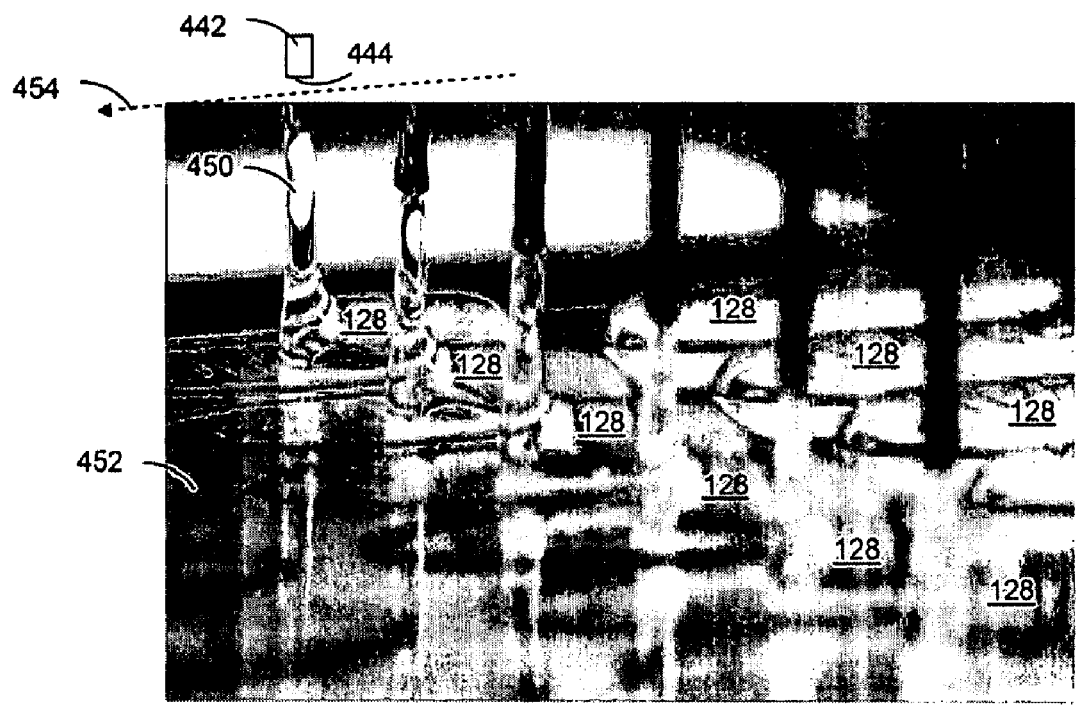

FIGS. 4A-4D show a method for fabricating the sub-card 104, in accordance with some embodiments. Referring to FIG. 4A, in accordance with some embodiments, a base 126 may be provided. The base 126 may have first and second major outer surfaces 402, 404. Although not shown in FIGS.

7A-7B, the base 126 may include the RFID IC 130 (FIG. 1A) and the antenna 132 (FIG. 1A).

The base 126 may have a length and a width that is smaller than the length and the width, respectively, of the card 102. In some embodiments, the base 126 has a footprint that is the same size as or slightly smaller than the surface that defines the bottom of the recess 120 (FIG. 1B).

FIG. 4B shows a method for fabricating the base 126, in accordance with some embodiments. Referring to FIG. 4B, according to some embodiments, a first layer 410 may be provided. The first layer 410 may have a footprint that is the same size as or slightly smaller than the surface that defines the bottom of the recess.

A second layer 420 may be disposed on a major outer surface of the first layer 410. The second layer 420 may have a footprint that is the same size as that of the first layer and may be disposed in register with the first layer 410 such that outer edges of the second layer are aligned with outer edges of the first layer. The second layer 420 may comprise a ferrite and/or other material that helps to electromagnetically decouple the circuitry and/or an antenna of a sub-card 104 from materials and/or signals of a device to which the sub-card 104 may be attached. Thus, in some embodiments, the sub-card 104 may be attached to a device having a metal support structure and the ferrite and/or other material of the second layer 420 may help prevent any signals received and/or supplied by the circuitry and/or an antenna of the sub-card 104 from being loaded down by such metal support structure. In some embodiments, without the ferrite and/or other material of the second layer 420, the metal support structure could effect frequencies and/or magnitudes of signals received and/or supplied by the circuitry and/or an antenna of the sub-card 104. In some embodiments, the ferrite and/or other material provides shielding from electromagnetic signals transmitted by such device.

In some embodiments the second layer 420 may comprise both a shield layer and a non conductive layer. The shield layer may provide shielding from electromagnetic signals that are possibly transmitted through the first layer 410. The conductive layer may electrically insulate the shield layer from layers disposed on the second layer 420.

A portion 430, sometimes referred to herein as an "inlay", may be disposed on a major outer surface of the second layer 420. The inlay 430 may include the RFID IC 130 and the antenna 132. In some embodiments, the antenna 132 may comprise conductive ink deposited or otherwise provided on the second major outer surface of the second layer 420. In some embodiments, the antenna 132 may be formed using one or more techniques employed in the manufacture of integrated circuits. In that regard, in some embodiments, the antenna 132 may be formed by depositing or otherwise providing material on the second major outer surface of the second layer 420 and thereafter patterning the material to define the antenna 132. In some other embodiments, the antenna 132 may be formed by providing a mask on the second major outer surface of the second layer 420 and thereafter depositing or otherwise providing material on the masked surface. The mask and the material deposited thereon may thereafter be removed to define antenna 132.

A third layer 440 may be disposed on the inlay 430. The third layer 440 may have a footprint that is the same size as that of the first layer 410 and the second layer 420 and may be disposed in register with the first layer 410 and the second layer 420.

Heat and/or pressure may be applied to the first layer 410 and/or the third layer 440. The heat and/or pressure may cause the first layer 410, the second layer 420, the inlay 430 and/or the third layer 440 to become bonded, thereby forming a laminate that includes first layer 410, the second layer 420, the inlay 430 and the third layer 440. In some embodiments, the first layer 410 and the third layer 440 are each formed of plastic or other suitable material.

Referring to FIG. 4C, a top 128 may be disposed on the first major outer surface 402 of the base 126. The top 128 may have a footprint that is the same as that of the base 126 and may be disposed in register with the base 126 such that outer edges of the top 128 are aligned with outer edges of the base 126.

The top 128 may be tapered so as to define a dome-like shape. In some embodiments, the top 128 may have a thickness that is substantially uniform across a central portion of the top 128 and may be tapered at edges.

In some embodiments, the top 128 may be substantially transparent and either colorless or tinted. In some embodiments, a top that is substantially transparent and colorless may help make the sub-card 104 less noticeable. In some embodiments, this may be desirable for security purposes.

In some other embodiments, the top 128 may be opaque and white or colored. In some embodiments, one or more colors may be chosen for aesthetic purposes. In some other embodiments, one or more colors may be chosen to help camouflage the sub-card, i.e., to help make the sub-card less noticeable. In some embodiments, the latter may be desirable for security purposes.

The top 128 may comprise resin and/or other material. One method for fabricating the top 128 is to provide the clear resin and/or other material in a liquid form. The clear resin and/or other material may be poured onto the first major outer surface of base 126 and/or some other surface. The resin and/or other material may not be self leveling and/or may have a surface tension that results in the dome-like shape of the top.

In some embodiments, the top 128 is fabricated on the base 126. In some other embodiments, the top 310 is fabricated separately from the base and thereafter attached to the base 126.

FIG. 4D shows a method for pouring resin and/or other material, in accordance with some embodiments. Referring to FIG. 4D, in accordance with some embodiments, the resin and/or other material, may be poured from a source 442 having an outlet 444 to produce a stream 450 that flows onto the first major outer surface of base 126 and/or some other surface, e.g., surface 452. The resin and/or other material may have a viscosity and/or surface tension that results in the dome-like shape of the top 128. The width and/or length of the top may be based at least in part on the dimensions of the stream and whether the source is stationary or in motion during fabrication of the top 128. In that regard, in some embodiments, the stream may have a width adapted to provide the top 128 with a desired width. The source of the stream 450 may be moved along a path 754 so as to provide the top 128 with a desired length.

As shown in FIG. 4D, in some embodiments, a plurality of streams may be used to fabricate a plurality of tops 128 at the same time. In some other embodiments, the resin and/or other material may be supplied to a mold and/or other type of form.

Other configurations may also be employed for the base 126, top 128 and/or sub-card 104.

In some embodiments, one or more portions of the sub-card 104 may be formed from one or more portions the card 102. In that regard, in some embodiments, the sub-card 104 may be formed by punching and/or cutting the sub-card 104 from the card 102.

Figures 5A, 5B:
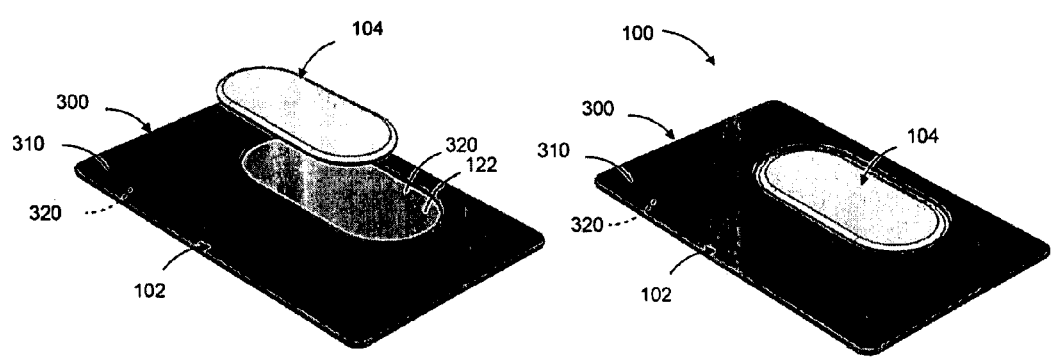
FIGS. 5A-5B show a method for releasably attaching a sub-card to a card, in accordance with some embodiments.

FIGS. 5A-5B show a method for releasably attaching the sub-card 104 to the card 102, in accordance with some embodiments. Referring to FIGS. 5A-5B, in accordance with some embodiments, adhesive may be disposed on the second major outer surface 404 of the base 126. Such adhesive is sometimes referred to herein as an adhesive backing.

One method for providing an adhesive backing is to deposit or otherwise provide adhesive on the surface 122 defining the bottom of the recess 120. The base 126 of the sub-card 124 may thereafter be inserted into the recess 120. Pressure may be provided to force the second major outer surface of the base 126 into contact with the adhesive, which may thereafter form the adhesive backing.

In some embodiments, the adhesive backing comprises an adhesive that permits the sub-card 104 to be peeled away from the card 102 to expose the adhesive backing of the sub-card 104. The sub-card 104 may thereafter be attached to a device. In accordance with some embodiments, the adhesive backing comprises a pressure sensitive adhesive.

In some embodiments, the surface 122 that defines the bottom of the recess 120 comprises a non-stick surface or other type of surface that readily releases the adhesive backing if the sub-card 104 is pulled away from the card 102. Such a surface may be formed of paper, coated paper, plastic and/or any other suitable material.

Another method for providing an adhesive backing is to coat the second major outer surface 404 of the base 126 with an adhesive having a liquid form. Another method is to apply an adhesive having a dry form. In some embodiments, dry adhesive suitable for use as a backing may be obtained in sheets and then cut to size. In some embodiments, double sided tape may be employed.

In some embodiments, the adhesive backing comprises an adhesive layer of uniform thickness distributed on all portions or at least substantially all portions of the second major outer surface of the base. In some other embodiments, adhesive may be disposed on less than all portions of the second major outer surface 404. In some embodiments, the adhesive disposed on the second major outer surface 404 may have a grid or grid-like configuration. In some embodiments, the adhesive may have circular and/or array of circles configuration. In some embodiments, the adhesive may be disposed only on the perimeter of the second major outer surface 404. In some embodiments, the adhesive may have an irregular configuration and/or a combination of one or more adhesive configurations disclosed herein.

In some embodiments, the sub-card 104 may be left on the card 102 for any length of time and peeled away without leaving a significant amount of the adhesive backing on the card 102 and without significant damage to the card 102 and/or sub-card 104.

Figure 6:
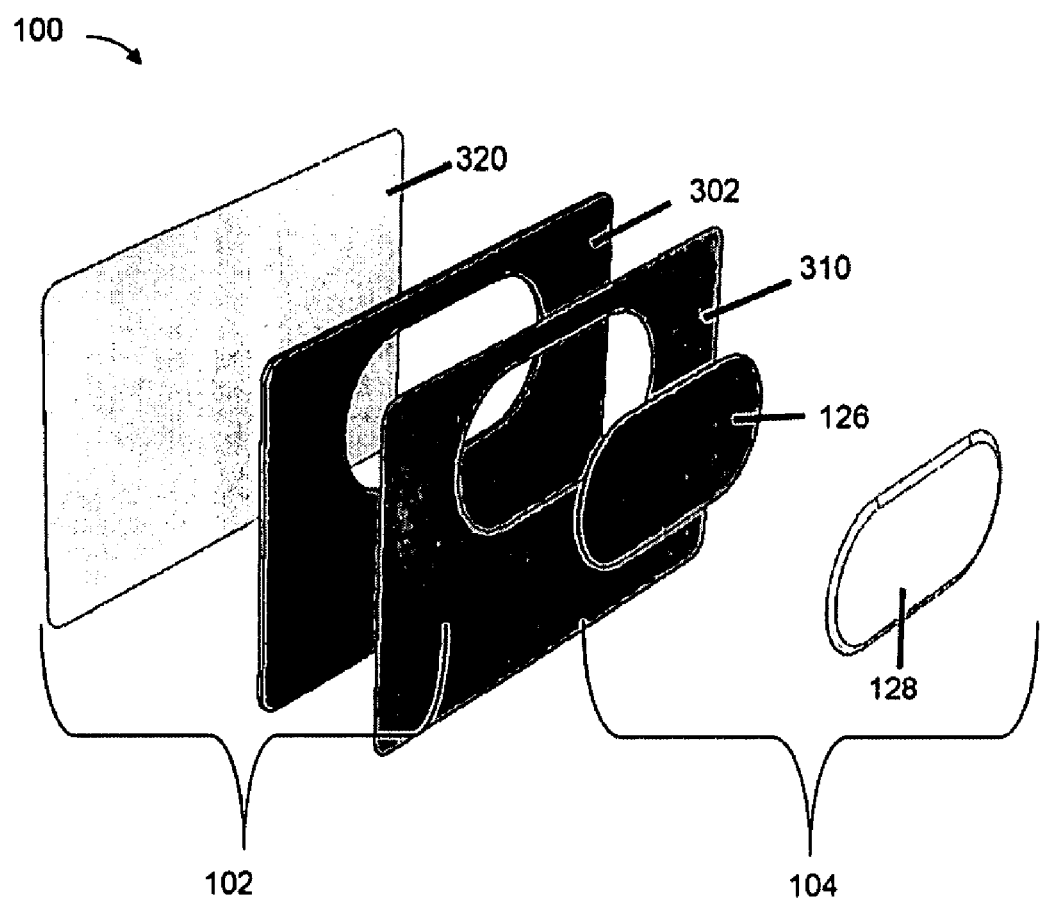
FIG. 6 is a schematic perspective view of a card in a disassembled state in combination with a perspective view of a sub-card in a disassembled state, according to some embodiments.

FIG. 6 is a schematic perspective view of the card 102 in a disassembled state in combination with a perspective view of the sub-card 104 in a disassembled state, according to some embodiments.

Figure 7:
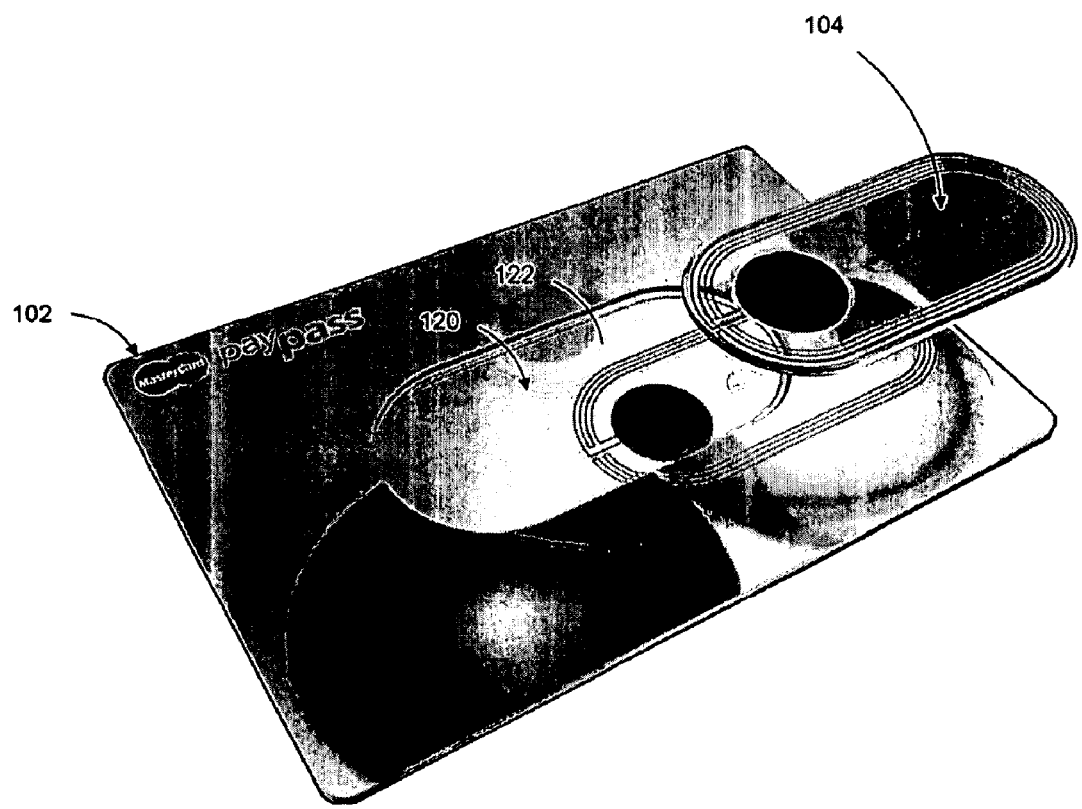
FIG. 7 is a perspective view of a card and a sub-card, after the sub-card is removed from the card, according to some embodiments.

FIG. 7 is a perspective view of the card 102 and the sub-card 104, after the sub-card 104 is removed from the recess 120, according to some embodiments. In some embodiments, the sub-card 104 may be removed by peeling the sub-card 104 from the card 102.

In some embodiments, the card 102 and/or sub-card 104 may include instructions. In some embodiments, the instructions may comprise instructions for removing the sub-card 104 from the card 102 and/or for attaching the sub-card 104 to another device.

Figure 8:
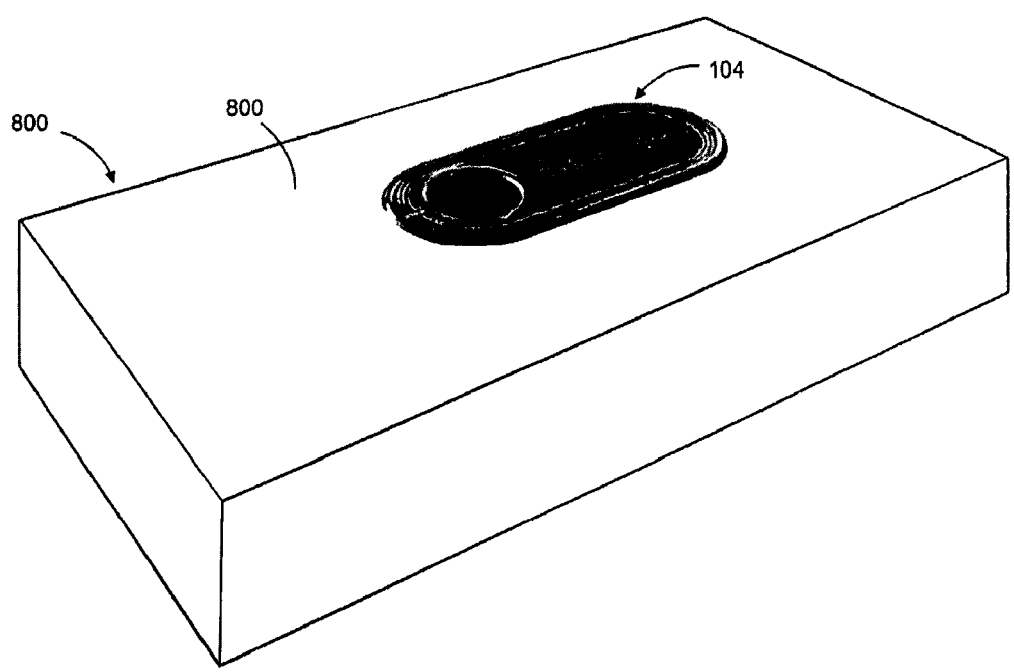
FIG. 8 is a schematic perspective view of a sub-card attached to a device, in accordance with some embodiments.

FIG. 8 is a schematic perspective view of the sub-card 104 attached to a device 800, in accordance with some embodiments. Referring to FIG. 8, in accordance with some embodiments, the device 800 may comprise a cell phone, a music player, a video player, a personal digital assistant (PDA), a wristwatch, a wristband, a bracelet, a pendant, a key fob and/or any other type of consumer or portable device.

The device 800 may comprise a support structure 802. The sub-card 104 may be attached to and/or supported by the support structure 802. If the device 800 comprises a cell phone, a music player, a video player, a PDA and/or a wristwatch, the support structure 802 may comprise a housing for the cell phone, the music player, the video player, the PDA and/or the wristwatch, respectively.

Figures 9A, 9B:
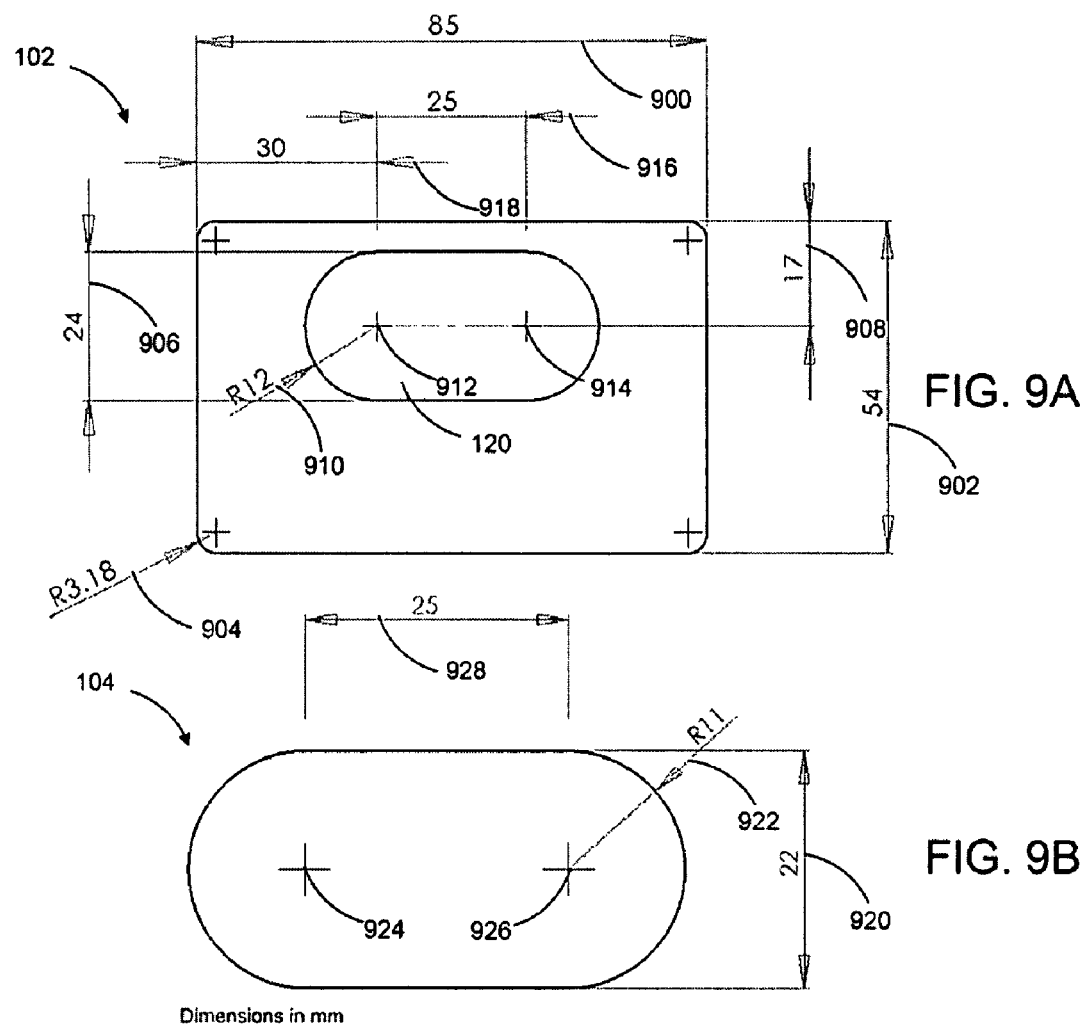
FIG. 9A is a schematic plan view of a card, in accordance with some embodiments.
FIG. 9B is a schematic plan view of a sub-card, in accordance with some embodiments.

FIG. 9A is a schematic plan view of the card 102, in accordance with some embodiments. Referring to FIG. 9A, in some embodiments, the card 102 has a length 900 of about 85 millimeters (mm) and a width 902 of about 54 mm. The rounded corners 118 (FIG. 1A) may have a radius 904 of about 3.18 mm. The recess 120 may have a width 906 of about 24 mm and a center disposed at a distance 908 of about 17 mm from a top or bottom edge 114, 116 of the card 102. The recess 120 may have two rounded ends each having a radius 910 of about 12 mm. The two rounded ends may be disposed about points 912, 914, respectively, that are spaced apart from one another by a distance 916 of about 25 mm and spaced apart from right and left edges 110, 112, respectively, by a distance 918 of about 30 mm.

FIG. 9B is a schematic plan view of the sub-card 104, in accordance with some embodiments. Referring to FIG. 9B, in some embodiments, the card 104 has a width 920 of about 22 mm and two rounded ends each having a radius 922 of about 11 mm. The two rounded ends may be disposed about points 924, 926, respectively, that are spaced apart from one another by a distance 928 of about 25 mm.

In some embodiments, the configuration and/or positioning of the recess 120 and/or sub-card 104 are chosen so as to help reduce or eliminate interference with a vacuum cup and/or other suction devices that may be employed in personalization equipment sometimes referred to herein as a personalization machine, that may be used to personalize the sub-card, such as for example, the model 9000 available from Datacard Group, Minnetonka, Minn.

In some embodiments, portions of the card 102 that are tapered and/or have reduced thickness may be disposed on a back of the card 102 so as to help reduce or eliminate interference with a vacuum cup and/or other suction devices that may be employed in the personalization equipment.

In some embodiments, the recess 120 may be covered by a thin film (not shown) that helps provide a flat surface for a vacuum cup and/or other suction devices that may be employed in the personalization equipment to pull on. In some embodiments, such thin film may be removed when the sub-card is removed from the card 102.

FIG. 9C is a schematic perspective view of a plurality of cards 102 disposed in a linear array within one type of personalization machine 930, in accordance with some embodiments. FIG. 9D is a schematic perspective view of a plurality of cards 102 stacked within another type of personalization machine 930, in accordance with some embodiments.

In some embodiments, other types of personalization machines and/or other arrangement of cards with a personalization machine may be employed.

Figure 10C:
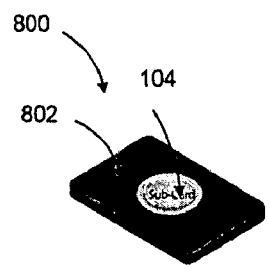
FIG. 10C is a perspective view of a sub-card attached to a device, in accordance with some embodiments.
Figure 10B:
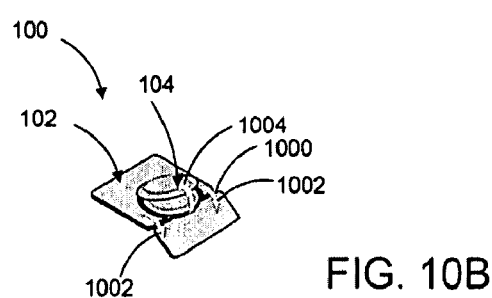
FIG. 10B is a stylized perspective view of a blank, with a portion of the blank in a bent state, in accordance with some embodiments.
Figure 10A:
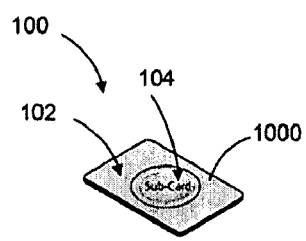
FIG. 10A is a perspective view of a blank for use in producing a proximity payment device, in accordance with some embodiments.

FIG. 10A is a perspective view of a blank 100 for use in producing a proximity payment device, in accordance with some embodiments. Referring to FIG. 10A, in accordance with some embodiments, the blank 100 includes a card 102 and sub-card 104, which may be the same and/or similar to the card 102 and sub-card 104 of the blank 100 illustrated in FIG. 1A. The card 102 may be scored, for example as indicated at 1000, so as to allow the card 102 to be readily bent and thereby assist in removal of the sub-card 104. In accordance with some embodiments, the sub-card 104 may have a circular footprint.

FIG. 10B is a stylized perspective view of the blank 100 of FIG. 10A, with a portion of the card 102 bent along scoring 1000, as indicated by arrows 1002, to thereby assist in removal of the sub-card 104, as indicated by arrow 1004.

In some embodiments, the card 102 may be flexible enough to be bent and thereby assist in removal of the sub-card 104, without the scoring 1000.

FIG. 10C is a perspective view of the sub-card 104 attached to a device 800, in accordance with some embodiments. The device 800 may be the same and/or similar to the device 800 illustrated in FIG. 8. The device 800 may comprise a support structure 802. The sub-card 104 may be attached to and/or supported by the support structure 802.

Figure 11:
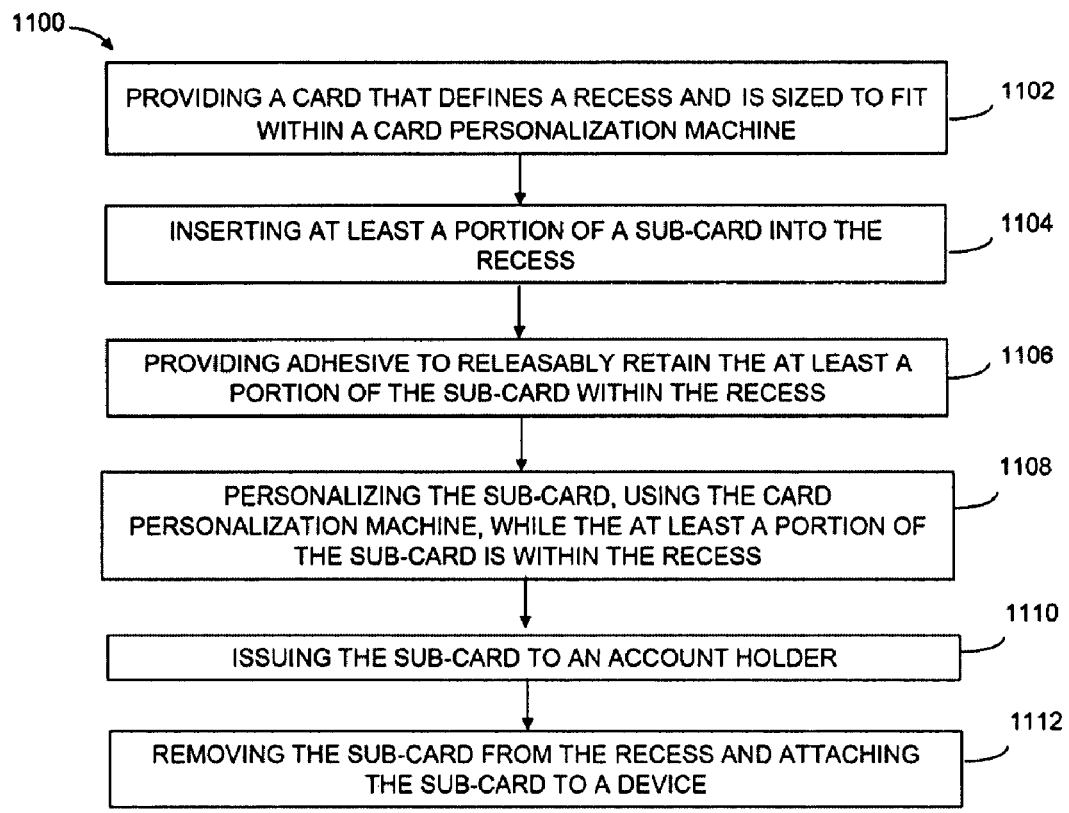
FIG. 11 is a flow chart that illustrates a method in accordance with some embodiments.

FIG. 11 is a flow chart 1100 of a method according to some embodiments. In some embodiments, the method may be used in association with the card 102 and/or the sub-card 104. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 1102, the method may include providing a card that defines a recess and is sized to fit within a card personalization machine. At 1104, the method may further include inserting at least a portion of a sub-card into the recess. At 1106, the method may further include using adhesive to releasably retain the at least a portion of the sub-card within the recess.

At 1108, the method may further include personalizing the sub-card, using the card personalization machine, while the at least a portion of the sub-card is within the recess.

In some embodiments, this may require pre-personalization of the sub-card 104. Pre-personalization may include storing information such as keys to be used in subsequent transactions and parameters to be used to select a particular card brand to be borne by the sub-card. In some embodiments, this may include writing information such as loading of keys to be used in subsequent transactions and parameters (such as to select a particular card brand to be borne by the sub-card) into the control/storage circuitry 204 (FIG. 2) of a sub-card 104.

In some embodiments, personalizing the sub-card may include assigning the sub-card to a particular payment account and/or a particular account holder by storing information in the sub-card. In some embodiments, this may include writing a payment card account number and a name of the account holder into the control/storage circuitry 204 (FIG. 2) of a sub-card 104. Other information, such as expiration date, may be stored in either of the pre-personalization and personalization steps. In some embodiments, pre-personalization and personalization steps may be combined into one operation.

Some embodiments may personalize and/or pre-personalize the sub-card 104 using wireless communication. In that regard, some embodiments may personalize and/or pre-personalize the sub-card 104 using contactless card programming equipment commonly used to program proximity payment cards, such as for example, a model 9000 available from Datacard Group, Minnetonka, Minn.

Information such as a payment card association brand, etc., may be printed on the card and/or sub-card as part of pre-personalization. In some embodiments, blanks are processed as a batch. The information transmitted to each card and/or sub/card and/or printed on each card and/or sub-card may be the same for all blanks in the batch.

In accordance with some embodiments, the payment account number and/or any other information (or a portion thereof) that was (or is to be) stored in the sub-card 104 may be printed on a surface of the card 102 and/or sub-card 104. In accordance with some embodiments, the printing of the payment account number on the card 102 and/or sub-card 104 may be by use of the above-mentioned Datacard 9000 equipment or by another suitable device with printing capabilities.

At 1110, the method may further include issuing the sub-card to an account holder. In some embodiments, this may include sending the card and the sub-card releasably retained within the recess, to the account holder. In some embodiments, sending may comprise mailing.

At 1112, the method may further include removing the sub-card from the recess of the card and attaching the sub-card to a device. In some embodiments, this may be carried out by the account holder, after the card and the sub-card are mailed to the account holder. In some embodiments, the device may comprise a cell phone, a music player, a video player, a PDA, a wristwatch, a wristband, a bracelet, a pendant, a key fob and/or any other type of consumer or portable device.

After personalization, the sub-card 104 may operate as a proximity payment device. In some embodiments, such proximity payment device may operate in accordance with the above-mentioned "PayPass" standard. In that regard, in some embodiments, the proximity payment device may be presented to a proximity coupling device (not shown) of a POS terminal (not shown) to accomplish payment for a sales transaction. The proximity coupling device may transmit an interrogation signal. The proximity payment device may receive the interrogation signal via the antenna 132 (FIG. 1A). The received interrogation signal may cause the circuitry of the proximity payment device to be powered-up. For example, the proximity payment device may include circuitry to rectify the received interrogation signal to generate a DC power that may be used to power the control/storage circuitry 204 (FIG. 2) and transmit/receive circuitry 208 (FIG. 2). The proximity payment device may transmit a signal to the proximity coupling device in response to the interrogation signal. The proximity payment device may transmit the signal (and possibly one or more additional signals) to the proximity coupling device via the antenna 132 (FIG. 1A). One or more signals transmitted by the proximity payment device may include a payment card account number and/or other information required for interaction with the proximity coupling device. In some embodiments, the proximity payment device may transmit the payment card account number and/or other information via the antenna 132 (FIG. 1A) after a handshake procedure or the like with the POS terminal. The POS terminal may then interact with a payment card system to charge the current sales transaction to the payment card account represented by the payment card account number received from the proximity payment device.

In some embodiments, the proximity payment device may be presented to the proximity coupling device by simply positioning the proximity payment device within wireless communication range of the proximity coupling device. In some embodiments, the proximity payment device may be presented to the proximity payment device by positioning the proximity payment device in physical contact with, and/or by tapping a portion of the proximity payment device on, the proximity coupling device.

In some embodiments, a proximity payment device may be selectively enabled/disabled in order to enable and/or disable operation of the proximity payment device. In some embodiments, a proximity payment device may be presented to a proximity coupling device before, during and/or after enabling operation of the proximity payment device.

Figure 12A:
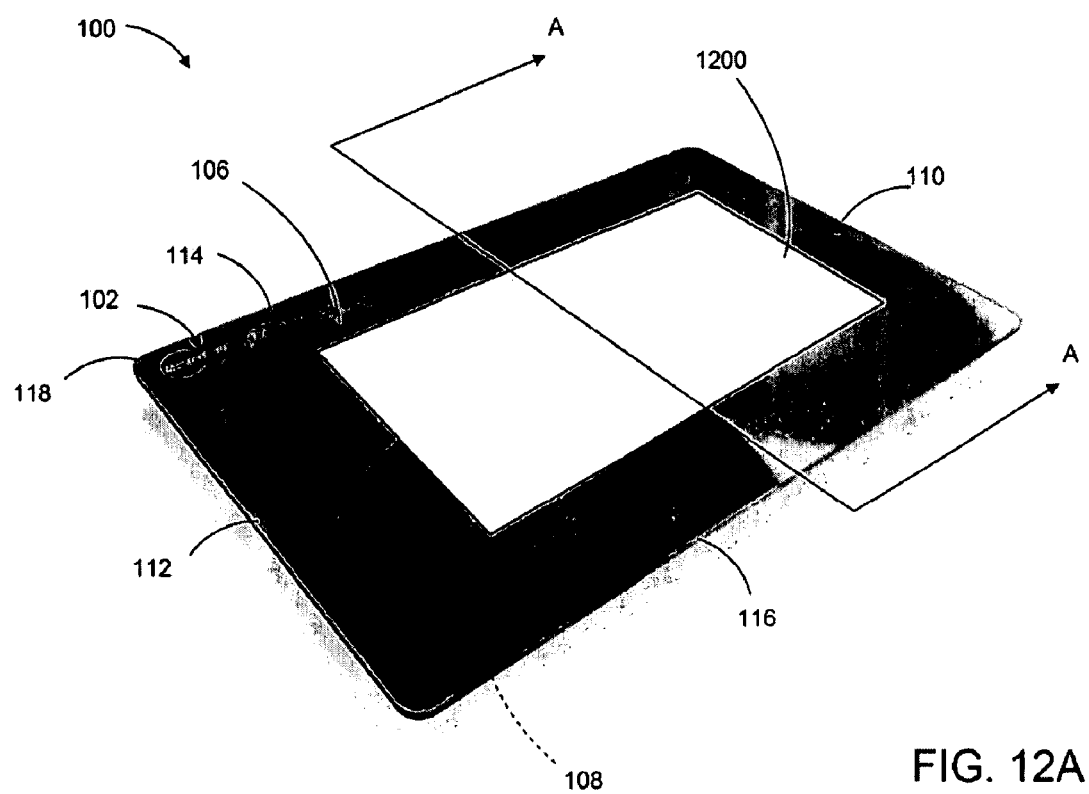
FIG. 12A is a perspective view of a blank for use in producing a proximity payment device, in accordance with some embodiments.
Figure 12B:
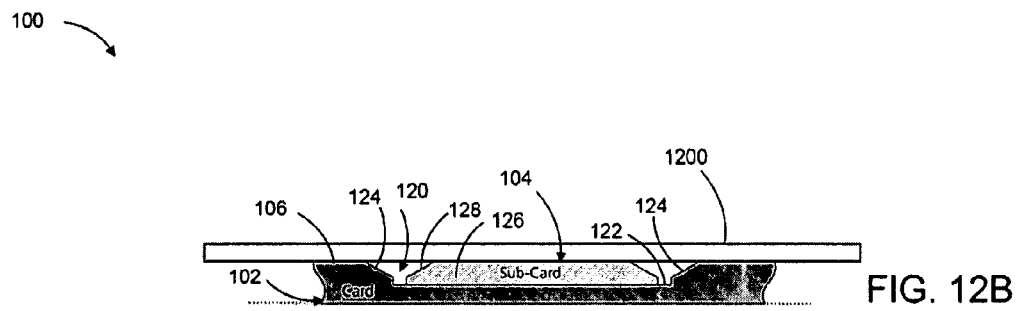
FIG. 12B is a schematic cross sectional view of the blank in the direction A-A of FIG. 12A, in accordance with some embodiments.

FIG. 12A is a perspective view of a blank for use in producing a proximity payment device, in accordance with some embodiments. FIG. 12B is a schematic cross sectional view of the blank in the direction A-A of FIG. 12A, in accordance with some embodiments. Referring to FIGS. 12A-12B, in accordance with some embodiments, the blank 100 includes a card 102 and sub-card 104, which may be the same and/or similar to the card 102 and sub-card 104 of the blank 100 illustrated in FIGS. 1A-1B.

In accordance with some embodiments, a cover 1200 may be disposed across at least a portion of the first major outer surface 106 of the card 102 and at least a portion of the recess 120 to releasably retain the at least a portion of the sub-card 104 within the recess 120. The cover 1200 may be in addition to or in lieu of adhesive disposed between the sub-card 104 and the card 102 to releasably retain the at least a portion of the sub-card 104 within the recess 120

In some embodiments, the cover 1200 may comprise an adhesive backing releasably adhered to the first major outer surface 106 of the card 102. The adhesive backing may comprise an adhesive that permits the cover 1200 to be peeled away from the card 102.

In some embodiments, the cover 1200 is releasably adhered to the sub-card 104. In such embodiments, peeling the cover 1200 from the card 102 may remove the sub-card 104 from the recess 120. The sub-card 104 may thereafter be manually or otherwise removed from the cover 1200 and attached to a device.

In some embodiments, peeling the cover 1200 from the card 102 may not remove the sub-card 104 from the recess 120, but may allow the sub-card 104 to be manually or otherwise removed from the recess 120 and attached to a device.

Figure 13:
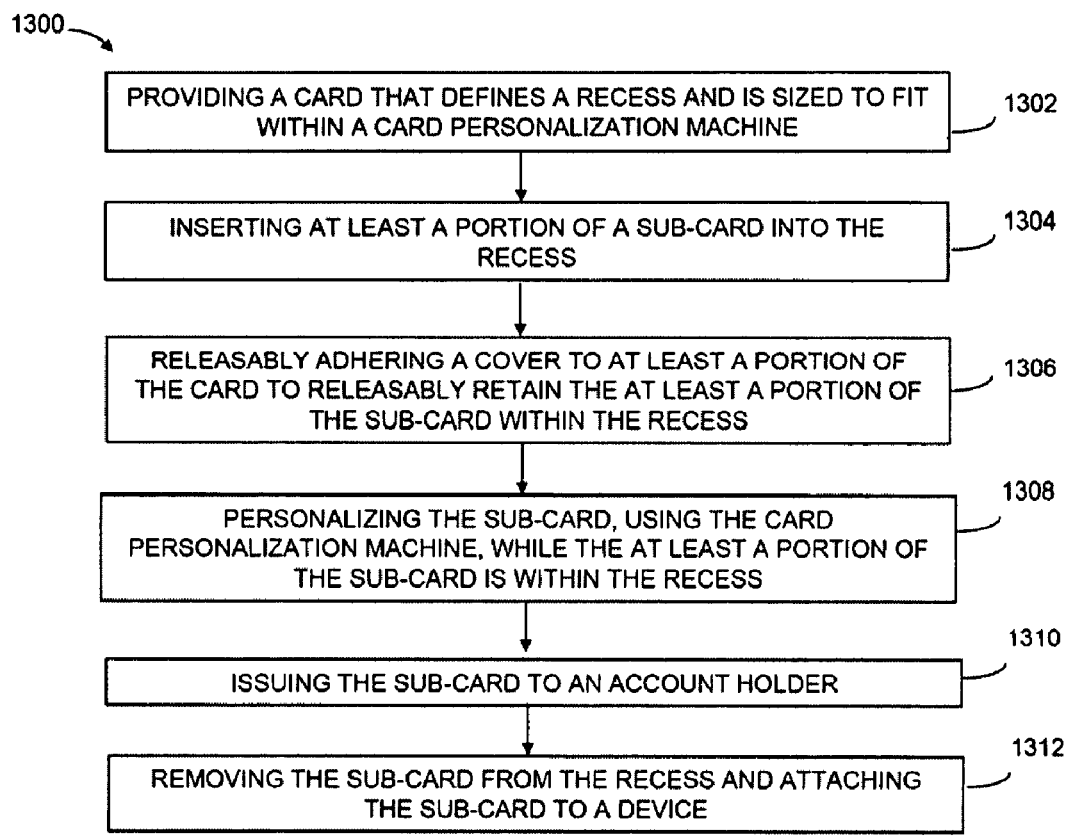
FIG. 13 is a flow chart that illustrates a method in accordance with some embodiments.

FIG. 13 is a flow chart 1300 of a method according to some embodiments. In some embodiments, the method may be used in association with the card 102, the sub-card 104 and/or the cover 1200. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 1302, the method may include providing a card that defines a recess and is sized to fit within a card personalization machine. At 1304, the method may further include inserting at least a portion of a sub-card into the recess.

At 1306, the method may further include releasably adhering a cover to at least a portion of the card to releasably retain the at least a portion of the sub-card within the recess. In some embodiments, the cover may comprise an adhesive backing releasably adhered to the card.

At 1308, the method may further include personalizing the sub-card, using the card personalization machine, while the at least a portion of the sub-card is within the recess. In some embodiments, this may be carried as described above with respect to the flowchart 1100 (FIG. 11).

At 1310, the method may further include issuing the sub-card to an account holder. In some embodiments, this may include mailing the card, and the sub-card releasably retained within the recess, to the account holder.

At 1312, the method may further include removing the sub-card from the recess of the card and attaching the sub-card to a device. In some embodiments, this may be carried out by the account holder, after the card and the sub-card are mailed to the account holder. In some embodiments, this may include removing the cover from the card, at least in part. In some embodiments, the device may comprise a cell phone, a music player, a video player, a PDA, a wristwatch, a wristband, a bracelet, a pendant, a key fob and/or any other type of consumer or portable device.

Figure 14:
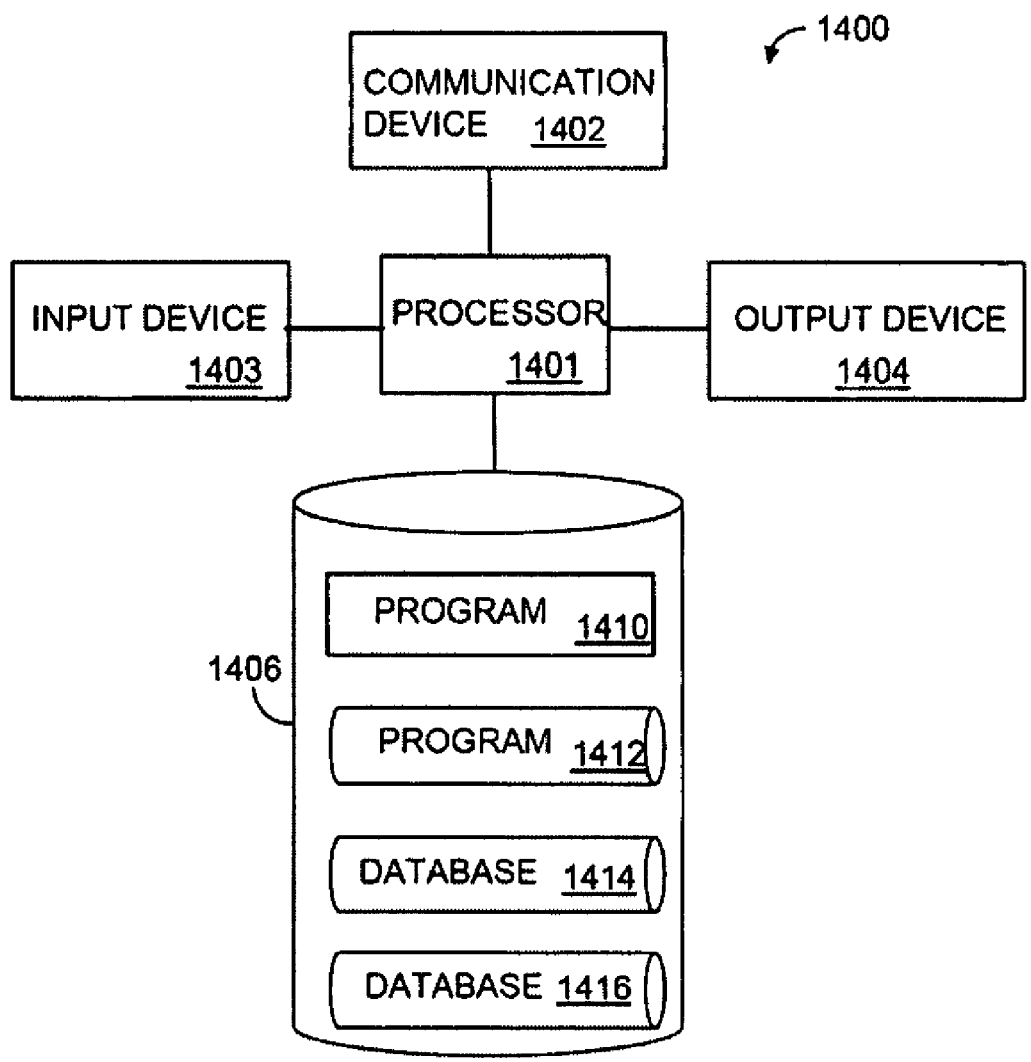
FIG. 14 is a schematic block diagram of an apparatus according to some embodiments.

FIG. 14 is a block diagram of an apparatus 1400 according to some embodiments. In some embodiments, one or more of the devices (or portion(s) thereof) disclosed herein may have an architecture that is the same as and/or similar to one or more portions of the architecture of apparatus 1400.

Referring to FIG. 14, in accordance with some embodiments, the apparatus 1400 includes a processor 1401 operatively coupled to a communication device 1402, an input device 1403, an output device 1404 and a storage device 1406.

In some embodiments, the processor 1401 may execute processor-executable program code to provide one or more portions of the one or more functions disclosed herein and/or to carry out one or more portions of one or more embodiments of one or more methods disclosed herein. In some embodiments, the processor 1401 may be a conventional microprocessor or microprocessors.

The communication device 1402 may be used to facilitate communication with other devices and/or systems. In some embodiments, communication device 1402 may be configured with hardware suitable to physically interface with one or more external devices and/or network connections. For example, communication device 1402 may comprise an Ethernet connection to a local area network through which apparatus 1400 may receive and transmit information over the Internet and/or one or more other network(s).

The input device 1403 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 1404 may comprise, for example, one or more devices used to output data and/or other information, such as, for example: an IR port, a docking station, a display, a speaker, and/or a printer, etc.

The storage device 1406 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 1406 may store one or more programs 1410-1412, which may include one or more instructions to be executed by the processor 1401.

In some embodiments, the one or more programs may include one or more operating systems, database management systems, other applications, other information files, etc., for operation of the apparatus 1400.

The storage device 1406 may store one or more databases 1414-1416 and/or criteria for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a computer program product, and/or a storage medium readable by a processing system.

In some embodiments, the card 102 may not have a recess and/or the sub-card 104 may not be inserted in a recess. Thus, while a card 102 with a recess has been shown and described, in some embodiments, the card 102 may not have a recess. Moreover, while a sub-card 104 has been shown and described inserted in a recess 120, in some embodiments, the sub-card 104 may not be inserted in a recess 120. In some embodiments, the sub-card 104 may be disposed on a surface that does not define any portion of a recess.

In some embodiments, if the sub-card 104 is not inserted in a recess, it may be desirable to reduce the thickness of the card 102 so that the maximum thickness of a blank 100 having a card 102 and a sub-card 104 not inserted in a recess is the same as that of a blank 100 having a card 102 with a recess 120 and a sub-card inserted therein.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

As used herein, a signal may be any type of signal, i.e., an analog signal, a digital signal, a single ended signal, a differential signal and/or any other type of signal or combination thereof.

A wireless communication interface may be any type of wireless communication interface.

As used herein, a controller may be any type of controller. For example, a controller may be programmable or non programmable, general purpose or special purpose, dedicated or non dedicated, distributed or non distributed, shared or not shared, and/or any combination thereof. If the controller has two or more distributed portions, the two or more portions may communicate with one another through a communication link. A controller may include, for example, but is not limited to, hardware, software, firmware, hardwired circuits and/or any combination thereof.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

A communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

As used herein, the term "proximity payment device" refers to any device, of any shape, which transmits to a point of sale terminal, by wireless transmission, a payment account number. As used herein, a payment account number may be numeric, non numeric and/or a combination thereof.

In some embodiments, a proximity payment device may also have a contact interface like that of a conventional smart card that includes a contact interface.

The principles taught herein have heretofore been described in the context of proximity payment devices. Nevertheless, these teachings are also applicable to any type of identification token. As used herein, the term "identification token" refers to a device, having a card shape or any other shape, that serves as one or more of a proximity payment device; a transportation related device; a device to identify the holder for purposes apart from or in addition to transaction payments (e.g., to identify medical patients and/or individuals insured by health insurance plans); a device used to portably store medical record information; stored value card(s); and to so-called electronic passports (also known as RFID-enabled passports) and/or a source of any type of information associated with a holder of the identification token (and/or the holder of the card installed therein).

The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

As used herein, an account number may be numeric, non numeric and/or a combination thereof.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method, comprising:

providing a card rectangular shaped with rounded corners and sized to fit within a card personalization machine, the card including a surface defining a recess in the surface of the card;

inserting all of a base of a sub-card into the recess in the surface of the card, the sub-card having a length dimension and a width dimension smaller than the card, not electrically coupled to the card, and to electronically function without the card;

providing adhesive between a bottom surface of the recess and a base of the sub-card to releasably retain the sub-card within the recess in the surface of the card;

pre-personalizing the sub-card while the sub-card is within the recess in the surface of the card by at least one of wirelessly transmitting information to the sub-card and printing information on the sub-card; and personalizing the sub-card, using the card personalization machine, while the sub-card is within the recess in the surface of the card.

2. The method of claim 1 wherein the card has dimensions as defined for an ID1 card in ISO/IEC standard 7810.

3. The method of claim 1 wherein the adhesive comprises an adhesive backing that allows the sub-card to be peeled from the card and thereafter attached to a device by the adhesive.

4. The method of claim 1 wherein the sub-card includes an RFID IC and an antenna electrically connected to the RFID IC.

5. The method of claim 4 wherein personalizing the sub-card includes storing an account number in the RFID IC.

6. The method of claim 1 further comprising:
removing, by the account holder, the sub-card from the card; and
attaching the sub-card to a device.

7. Apparatus comprising:
a card rectangular shaped with rounded corners and defining a recess in a surface of the card;
a sub-card having a length dimension and a width dimension smaller than the card and all of its base inserted into the recess of the card, the sub-card is not electrically coupled to the card and electronically functions without the card;
a cover disposed across at least a portion of a first major outer surface of the card and at least a portion of the recess to releasably retain the sub-card within the recess; and
a card personalization machine to personalize the sub-card while the sub-card is retained within the recess in the surface of the card;
wherein the card is sized to fit within the card personalization machine.

8. The apparatus of claim 7 wherein the card has dimensions as defined for an ID1 card in ISO/IEC standard 7810.

9. The apparatus of claim 7 wherein the sub-card includes an RFID IC and an antenna electrically connected to the RFID IC.

10. The apparatus of claim 9 wherein an account number is stored in the RFID IC.

11. A method, comprising:
providing a rectangular shaped card with rounded shoulders and sized to fit within a card personalization machine, the card defining a recess in a surface of the card;
inserting a base of the sub-card into the recess in the surface of the card, the sub-card having a length dimension and a width dimension smaller than the card and to electronically function without the card;
releasably covering at least a portion of the card with a cover to retain the sub-card within the recess in the surface of the card;
pre-personalizing the sub-card while the sub-card is within the recess in the surface of the card by at least one of wirelessly transmitting information to the sub-card and printing information on the sub-card; and
personalizing the sub-card, using the card personalization machine, while the sub-card is within the recess in the surface of the card.

12. The method of claim 11 wherein the card has dimensions as defined for an ID1 card in ISO/IEC standard 7810.

13. The method of claim 11 wherein the cover comprises a sheet having an adhesive backing.

14. The method of claim 11 wherein the sub-card includes an RFID IC and an antenna electrically connected to the RFID IC.

15. The method of claim 14 wherein personalizing the sub-card includes storing an account number in the RFID IC.

16. The method of claim 11 further comprising sending the card and the sub-card inserted into the recess of the card to an account holder who removes the sub-card from the card and thereafter attaches the sub-card to a device.

17. The method of claim 11 wherein inserting the sub-card into the recess comprises providing a sub-card and wherein providing a sub-card comprises providing a stream of material that flows onto a surface to form a top of the sub-card.

\* \* \* \* \*